Patented Mar. 5, 1929.

1,703,902

UNITED STATES PATENT OFFICE.

WINFIELD SCOTT, OF AKRON, OHIO, ASSIGNOR TO THE RUBBER SERVICE LABORATORIES COMPANY, OF AKRON, OHIO, A CORPORATION OF OHIO.

PROCESS OF VULCANIZING RUBBER AND PRODUCT THEREFROM.

No Drawing. Application filed March 10, 1927. Serial No. 174,422.

My present invention relates to processes for vulcanizing rubber and similar materials and to the products obtained thereby, and is particularly directed to the acceleration of the vulcanization step by employing in that step phendithioles and derivatives thereof, as are hereinafter set forth and described.

In a series of papers published by H. Apitzsh in volumes 37, 38 and 41 of Ber. der. Deut. Chem. Ges. there are described the manufacture of compounds by reacting carbon bisulphide with an alkali such as potassium hydroxide and ketones of the type represented by the formula $R.CH_2.CO.CH_2R$ where R represents alkyl or aryl groups. The reaction taking place between these substances is as follows:

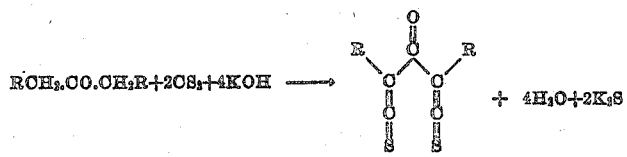

$$RCH_2.CO.CH_2R + 2CS_2 + 4KOH \longrightarrow \quad + 4H_2O + 2K_2S$$

A further reaction then proceeds in the following manner:

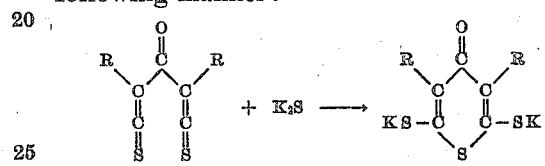

$$+ K_2S \longrightarrow$$

The potassium or other metallic salts so obtained are readily transformed by reaction with an acid to produce a compound represented by the formula

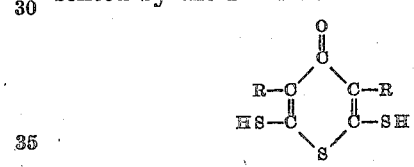

It is evident that such compounds are acids of the type known as mercaptans and contain two substituent groups of an acidic nature that will combine with organic or inorganic bases to produce salts. I have found that derivatives of these phendithiole compounds and more particularly the mercaptans derived therefrom, and preferably the organic salts of these mercaptans, comprise a class of valuable and very effective accelerators of the rubber vulcanization process.

An example whereby one mono-methyl substituted compound of the type mentioned was manufactured, is as follows: 42 parts of methyl-ethyl-ketone and approximately 180 parts of carbon bisulphide were placed in a reaction vessel equipped with a reflux condenser and a stirrer. The reaction vessel is preferably of the jacketed type with means provided for furnishing heating or cooling fluid to the vessel. Approximately 130 parts of suitably ground potassium hydroxide were then added preferably in portions to the mixture which was suitably stirred. The reaction took place following the addition of the alkali and sufficient heat was evolved to raise the temperature of the carbon bisulphide to its boiling point. Cooling means may be flowed through the jacket of the container in case the refluxing action becomes too rapid.

After the entire quantity of alkali had been added, and the reaction had subsided somewhat, heat was applied to the jacket of the vessel and the mixture was heated with stirring for from one to three hours, sufficiently to produce a gentle reflux of the uncombined carbon bisulphide present. At the end of this heating period, the refluxing action was discontinued and the readily volatilizable substances were removed from the reaction product by distillation means. The mercaptan or free acid desired, that is, 1 keto-2-methyl-4-thio-3.5 phendithiole was obtained from the potassium salt by treatment of the alkaline solution with the necessary quantity of an acid, such as hydrochloric, sulphuric acid and the like, preferably in the cold. The mercaptan compound was thereby precipitated and was separated from the liquid present by ordinary filtration means. The product, after further purification and drying, was a yellow crystalline material melting at from 144.5 to 145° C.

Similar derivatives have likewise been prepared by employing methyl-benzyl-ketone, as well as other ketones and derivatives thereof, which possess the general formula

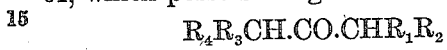

where $R_1$ and $R_3$ may represent hydrogen atoms and $R_2$ represents an alkyl group or hydrogen and $R_4$ represents a hydrogen atom. The type of ketone employed in the manufacture of the preferred class of compounds contains a methyl group attached to a carbonyl group to which is joined a second methyl or other alkyl grouping.

The mercaptans produced by the reaction of an acid upon the reaction product of a ketone of the type hereinabove set forth, an alkali and carbon bisulphide, will combine with organic substances possessing basic properties to produce salts thereof. Thus, substantially 190 parts (1 molecular proportion) of 1 keto-2 methyl-4 thio-3,5 phendithiole and 420 parts (2 molecular proportions) of di-phenyl-guanidine have been combined together by maintaining the mixture thereof at a temperature above 150° C. for a period of time sufficient to produce complete combination between the interacting substances. The mass is then allowed to cool down whereupon a hard, dark colored resinous product that can be readily ground is then obtained. Di-o-tolyl-guanidine, phenyl-o-tolyl-guanidine, and other symmetrical and unsymmetrical substituted guanidines, such as di-phenetidyl-guanidine, di-piperidyl-guanidine, tetra-methyl-amino-di-o-tolyl-guanidine and the like, as well as other basic organic compounds such as hexa-methylene-tetramine, aldehyde ammonia, biguanide and its derivatives, the guanyl-ureas, the organic ammonium and sulphonium derivatives, primary amines, secondary amines such as piperidine, di-benzyl-amine and the like and amino derivatives of basic nature which react with mercaptans to form organic salts, combine in the same manner as does di-phenyl-guanidine in the example set forth. The various salts, as well as the mercaptans comprise a class of accelerators of the rubber vulcanization process susceptible for use in the manufacture of various types of rubber compounds as are illustrated by the following example.

Thus a so-called pure gum stock was prepared in the well known manner, comprising a mixture of 100 parts of pale crepe rubber,
5 parts of zinc oxide,
3.5 parts of sulphur,
0.5 part of the accelerator.

As the accelerator there was employed the di-phenyl-guanidine salt of the mercaptan obtained by treating with an acid the reaction product of methyl-ethyl-ketone, carbon bisulphide and potassium hydroxide, that is, 1 keto-2 methyl-4 thio-3,5 phendithiole. A similar rubber mix was also manufactured in which an equal weight of di-phenyl-guanidine was employed in place of the accelerator specified. Portions of these two compositions were then vulcanized by heating in a press for different periods of time and under different temperature conditions and the resulting vulcanized products were then tested and their physical characteristics determined and compared. The results obtained were as follows:

| Accelerator | Time of cure | Modulus of elasticity at elongation of— | | | Tensile at break in lbs./in² | Ultimate elongation |
|---|---|---|---|---|---|---|
| | | 300% | 500% | 700% | | |
| Salt of phendithiole | 45 min. at 258° F. | 169 | 361 | 1230 | 2538 | 845% |
| Di-phenyl-guanidine | 45 min. at 258° F. | 83 | 153 | 356 | 1573 | 955% |
| Salt of phendithiole | 15 min. at 287° F. | 201 | 417 | 1413 | 2748 | 840% |
| Di-phenyl-guanidine | 15 min. at 287° F. | 121 | 214 | 570 | 1745 | 925% |
| Salt of phendithiole | 30 min. at 287° F. | 263 | 641 | 2485 | 3275 | 765% |
| Di-phenyl-guanidine | 30 min. at 287° F. | 187 | 368 | 1255 | 2545 | 835% |
| Salt of phendithiole | 45 min. at 287° F. | 309 | 772 | 2950 | 3295 | 730% |
| Di-phenyl-guanidine | 45 min. at 287° F. | 207 | 408 | 1503 | 2795 | 815% |

It is seen from the above table that the rubber stock manufactured by the use of one of my new type of compounds is superior in quality when vulcanized for varying times and at different temperatures than is a corresponding rubber compound in which di-phenyl-guanidine is employed as an accelerator.

Another example illustrative of the use of my new type of accelerators is the following which comprises a rubber compound typical of a tread stock:

31 parts of smoked sheet rubber,
20 parts of amber crepe rubber,
20.5 parts of zinc oxide,
19 parts of carbon black, 3.5 parts of mineral rubber,
1 part of a blended mineral and vegetable oil,
2 parts of sulphur,
1 part of the accelerator, for example di-phenyl-guanidine salt of 1 keto-2 methyl-4 thio 3,5 phendithiole.

The rubber compound so obtained was then vulcanized in the usual manner by heating portions thereof for different times in a press at a temperature given by forty pounds of steam pressure per square inch (287° F.). The vulcanized products were then tested and the following results were obtained:

| Time of cure | Modulus of elasticity at elongation of— | | Tensile at break in lbs./in² | Ultimate elongation |
| --- | --- | --- | --- | --- |
| | 300% | 500% | | |
| 30 min. at 287° F | 1578 | 3330 | 3973 | 590% |
| 45 min. at 287° F | 1730 | 3518 | 3970 | 570% |
| 60 min. at 287° F | 1788 | 3495 | 3718 | 535% |
| 90 min. at 287° F | 1938 | | 3475 | 485% |
| 180 min. at 287° F | 1718 | | 3108 | 475% |

The stock is completely vulcanized to produce a commercial product after heating for from thirty to forty-five minutes under the conditions specified, but the data given for the modulus of elasticity at 300% elongation shows substantially no reversion if the heating is continued even for as long as three hours.

Accelerators of the type hereinbefore described have also been employed in the manufacture of a hard rubber. An example of such a composition comprised
20 parts amber crepe rubber,
20 parts smoked sheet rubber,
15 parts zinc oxide,
5 parts lime,
10 parts mineral rubber,
25 parts sulphur,
2 parts of the di-phenyl-guanidine salt of a phendithiole.

Another hard rubber composition comprised:
40 parts smoked sheet rubber,
18 parts zinc oxide,
40 parts sulphur,
2 parts of one of my preferred accelerators.

In both cases, hard rubbers of good qualities were obtained after heating in a press for from one hour and forty-five minutes to two hours under the temperature given by forty pounds of steam pressure per square inch.

The various examples hereinbefore given are to be understood as illustrative and not limitative of my invention. Thus, other examples of the use of the accelerators in other types of rubber compounds are apparent to those skilled in the art of rubber compounding.

In an earlier application Serial No. 61,587, filed by me on October 9, 1925, I have disclosed and claimed as accelerators the reaction product of a mercaptan with a fully saturated organic base. The present application is a continuation in part of this earlier application mentioned and relates, as hereinbefore explained, to the use as accelerators of the reaction product of saturated or unsaturated organic bases with mercaptans containing the grouping.

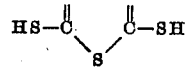

which mercaptans contain no nitrogen atom in their molecule.

My invention is not limited to the particular method described for manufacturing the accelerators set forth nor by any theory advanced in explanation of the changes taking place in the production of the accelerators, but is limited solely by the following claims appended hereto as a part of the specification wherein I intend to claim all novelty inherent in my invention that is permissible in view of the prior art.

What is claimed is:

1. A method of vulcanizing rubber which comprises heating rubber and sulphur in the presence of an accelerator comprising the reaction product of di-phenyl-guanidine with 1 keto-2 methyl-4 thio-3,5 phendithiole.

2. A vulcanized rubber product obtained from heating rubber and sulphur in the presence of the reaction product of di-phenyl-guanidine with 1 keto-2 methyl-4 thio-3,5 phendithiole.

In testimony whereof I affix my signature.

WINFIELD SCOTT.